(12) United States Patent
Asano

(10) Patent No.: US 9,588,404 B2
(45) Date of Patent: Mar. 7, 2017

(54) OPERATION APPARATUS, LENS APPARATUS, LENS SYSTEM, AND IMAGE PICKUP APPARATUS INCLUDING THE LENS SYSTEM

(71) Applicant: CANON KABUSHIKI KAISHA, Tokyo (JP)

(72) Inventor: Takurou Asano, Kawachi-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 61 days.

(21) Appl. No.: 14/789,152

(22) Filed: Jul. 1, 2015

(65) Prior Publication Data

US 2016/0004143 A1 Jan. 7, 2016

(30) Foreign Application Priority Data

Jul. 2, 2014 (JP) ................ 2014-136755

(51) Int. Cl.
*G02B 13/16* (2006.01)
*H04N 5/225* (2006.01)
(Continued)

(52) U.S. Cl.
CPC ......... *G03B 17/18* (2013.01); *G02B 13/0015* (2013.01); *G03B 13/34* (2013.01);
(Continued)

(58) Field of Classification Search
CPC ........ G03B 17/18; G03B 13/34; G03B 17/14; G03B 2205/0053; H04N 5/23203; H04N 5/2254; G02B 13/0015
(Continued)

(56) References Cited

U.S. PATENT DOCUMENTS

2005/0019030 A1 1/2005 Sasaki et al.
2013/0064533 A1* 3/2013 Nakata ............... G03B 3/10
 396/76
(Continued)

FOREIGN PATENT DOCUMENTS

JP 2005043713 A 2/2005
JP 2005227373 A 8/2005
(Continued)

*Primary Examiner* — Yogesh Aggarwal
(74) *Attorney, Agent, or Firm* — Rossi, Kimms & McDowell LLP

(57) ABSTRACT

An operation apparatus mountable/dismountable to/from a lens apparatus including a movable optical element, including: a detector detecting a position signal corresponding to a position of the optical element in a state of being mounted to the lens apparatus; a memory storing a reference position signal; i.e., a position signal at a time when the optical element is located at a reference position while being mounted to the lens apparatus; a determiner determining whether or not being dismounted from the lens apparatus after the reference position signal is stored; and a controller switching between an adjustment mode where the reference position signal is stored in the reference memory and a normal mode where the reference position signal is not stored, and controlling the operation apparatus to operate in the adjustment mode when the determiner determines the operation apparatus being dismounted from the lens apparatus after storing the reference position signal.

12 Claims, 14 Drawing Sheets

(51) Int. Cl.
   *G03B 17/18*   (2006.01)
   *G03B 17/14*   (2006.01)
   *G03B 13/34*   (2006.01)
   *G02B 13/00*   (2006.01)
   *H04N 5/232*   (2006.01)
(52) U.S. Cl.
   CPC ........... *G03B 17/14* (2013.01); *H04N 5/2254* (2013.01); *H04N 5/23203* (2013.01); *G03B 2205/0053* (2013.01)
(58) Field of Classification Search
   USPC ............... 348/335, 340, 345, 348, 350, 352; 396/661, 529, 532, 531, 530, 79, 81, 89; 714/776
   See application file for complete search history.

(56) References Cited

U.S. PATENT DOCUMENTS

2013/0113985 A1\* 5/2013 Ikeda ..................... G02B 7/102
   348/347
2013/0148008 A1\* 6/2013 Ikeda ....................... G02B 7/04
   348/345

FOREIGN PATENT DOCUMENTS

| JP | 2011075965 A | 4/2011 |
|---|---|---|
| JP | 2012113018 A | 6/2012 |

\* cited by examiner

OPERATION APPARATUS, LENS APPARATUS, LENS SYSTEM, AND IMAGE PICKUP APPARATUS INCLUDING THE LENS SYSTEM

BACKGROUND OF THE INVENTION

Field of the Invention

The present invention relates to an operation apparatus, and more particularly, to an operation apparatus that is mountable and dismountable to and from a lens apparatus including a movable optical member such as a zoom lens, a focus lens, and an iris, the operation apparatus including a position detection device configured to detect a position of the movable optical member, a lens apparatus that is mountable and dismountable to and from the operation apparatus, a lens system that is mountable and dismountable to and from the lens apparatus, and an image pickup apparatus including the lens system.

Description of the Related Art

At present, in lens systems for use in photography for television programs and movies, a movable optical member such as for zooming and focusing is required to be electrically operable so that the movable optical member is more smoothly operated. On the other hand, users who are accustomed to hitherto-used manual operations, such as directly rotating an operation ring with his/her hand, have requested that hitherto-used manual operations as well as electrical operations be available.

In Japanese Patent Application Laid-Open No. 2005-43713, in order to respond to such request, there is proposed a lens system in which an accessory unit, which is electrically operable and is mountable and dismountable to and from a hitherto-used manually operable lens unit, is mounted to the lens unit.

When an accessory unit including a detector configured to detect a position of a movable optical member included in a lens unit is dismounted from the lens unit once and is mounted to the lens unit again, it is necessary to perform edge adjustment for deriving a position of each optical member. However, in the related art disclosed in Japanese Patent Application Laid-Open No. 2005-43713, there is no description on the adjustment method. In general, the adjustment operation for deriving the position of each optical member often involves complicated operations, such as pressing a plurality of switches simultaneously, in order to prevent the adjustment operation from being performed during normal operation. Accordingly, when the accessory unit is mounted and dismounted to and from the lens unit, the user is required to perform cumbersome operations, such as complicated operations, while reading an instruction manual.

SUMMARY OF THE INVENTION

The present invention provides a lens system, which is capable of performing edge adjustment without the need of cumbersome operations even when an accessory unit configured to detect a position of a movable optical member included in a lens unit is mounted and dismounted to and from the lens unit, and provides an image pickup apparatus including the lens system.

In order to achieve the above-mentioned object, according to one embodiment of the present invention, there is provided an operation apparatus, which is mountable and dismountable to and from a lens apparatus including an optical element that is movable, the operation apparatus including: a first detector configured to detect a position signal corresponding to a position of the optical element in a state in which the operation apparatus is mounted to the lens apparatus; a reference memory configured to store a reference position signal, which is a position signal at a time when the optical element is located at a reference position, in the state in which the operation apparatus is mounted to the lens apparatus; a determiner configured to determine whether or not the operation apparatus is dismounted from the lens apparatus after the reference position signal is stored; and a controller configured to switch between a case where the operation apparatus operates in an adjustment mode in which the reference position signal is stored in the reference memory and a case where the operation apparatus operates in a normal mode in which the reference position signal is not stored. The controller is further configured to control the operation apparatus to operate in the adjustment mode when the determiner determines that the operation apparatus is dismounted from the lens apparatus after the reference position signal is stored.

According to the one embodiment of the present invention, it is possible to provide the lens system, which is capable of performing edge adjustment without the need of cumbersome operations even when the accessory unit configured to detect the position of the movable optical member included in the lens unit is mounted and dismounted to and from the lens unit, and provide the image pickup apparatus including the lens system.

Further features of the present invention will become apparent from the following description of exemplary embodiments with reference to the attached drawings.

DESCRIPTION OF THE EMBODIMENTS

Now, exemplary embodiments of the present invention are described in detail with reference to the accompanying drawings.

First Embodiment

Figure 1:
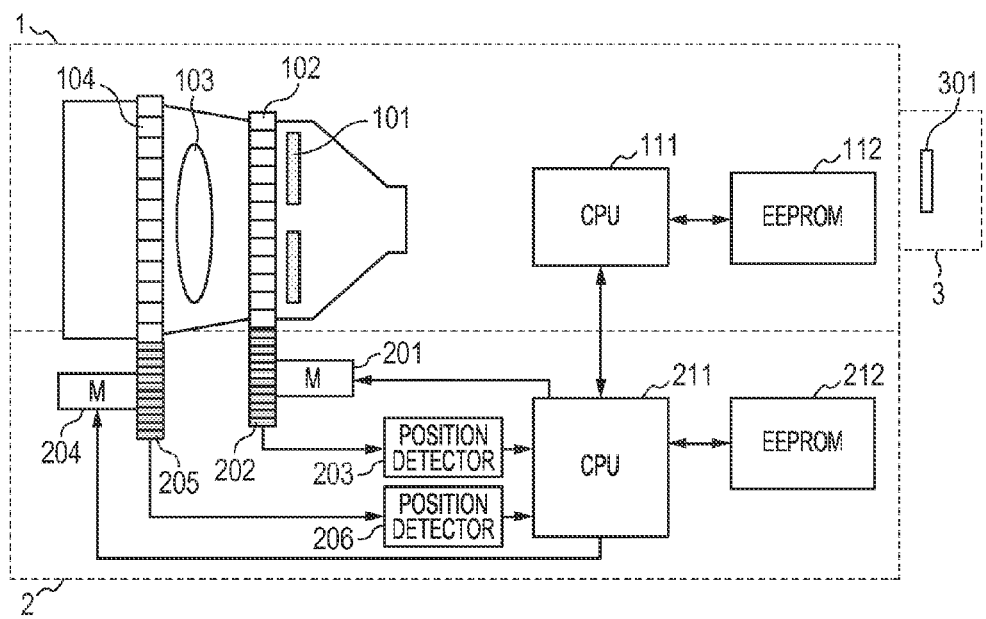
FIG. 1 is a block diagram of a lens system according to a first embodiment of the present invention.

FIG. 1 is an illustration of configurations of a lens system and an image pickup apparatus including the lens system according to a first embodiment of the present invention.

The lens system according to this embodiment is roughly divided into a lens unit (lens apparatus) 1 and an accessory unit (operation apparatus, demand apparatus) 2. Note that, the accessory unit 2 is mountable and dismountable to and from the lens unit 1, and in the case of photography only with manual operations, only the configuration of the lens unit 1 is used. Further, the lens system according to the present invention and an image pickup unit 3 including an image pickup apparatus 301 configured to receive light from the lens system can be used together to construct an image pickup apparatus including the lens system according to the present invention.

The detailed configuration of the lens unit 1 is described.

A stop 101 is an optical element configured to change an amount of light and a depth of focus of an image to be imaged (formed) by the lens unit 1. The stop 101 can be mechanically moved (operated) through rotation of a stop operation ring 102.

A focus lens group 103 is an optical element configured to move in an optical axis direction to displace an imaging position of the lens unit 1. The focus lens group 103 can be mechanically operated in the optical axis direction through rotation of a focus operation ring 104.

A lens CPU 111 is a device configured to detect mount/dismount of the lens unit 1 and the accessory unit 2, communicate to and from an accessory CPU 211, and perform other kinds of control through software processing to be described later.

An EEPROM (mount memory) 112 is a non-volatile memory or a storage device including a non-volatile memory, and stores information in response to an instruction from the lens CPU 111.

Next, the detailed configuration of the accessory unit 2 is described.

A stop motor 201 is an actuator (electric driver) configured to rotate the stop operation ring 102 via a stop gear 202. A stop position detector 203 (first detector) is a detector configured to detect a rotation position of the stop gear 202. In this embodiment, the stop position detector 203 is an absolute position detector configured to output a signal unique to an arbitrary position of the stop gear 202 as shown in FIG. 2.

A focus motor 204 is an actuator (electric driver) configured to rotate the focus operation ring 104 via a focus gear 205. A focus position detector 206 (first detector) is a detector configured to detect a rotation position of the focus gear 205, and is an absolute position detector similarly to the stop position detector 203.

Figure 2:
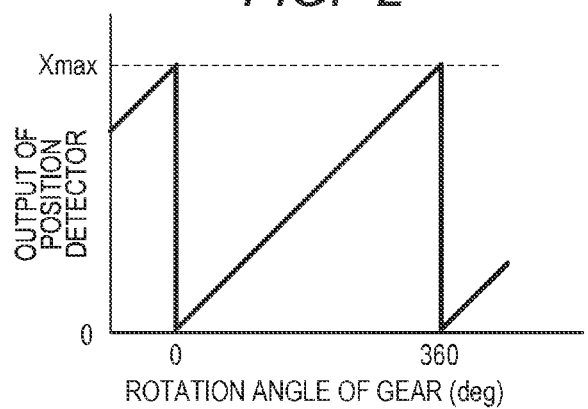
FIG. 2 is a graph for showing output characteristics of a stop position detector 203.

Note that, in this embodiment, the stop position detector 203 and the focus position detector 206 are each an absolute position detector configured to output the signal as shown in FIG. 2, but it is only necessary to detect an absolute position. The stop position detector 203 and the focus position detector 206 may each be a combination of a relative position detector and an origin sensor.

The accessory CPU 211 is a device configured to control the stop operation ring 102 and the focus operation ring 104, communicate to and from the lens CPU 111, and perform other kinds of control through software processing to be described later.

An EEPROM (reference memory) 212 is a non-volatile memory or a storage device including a non-volatile memory, and stores information in response to an instruction from the accessory CPU 211 (controller).

Figure 3:
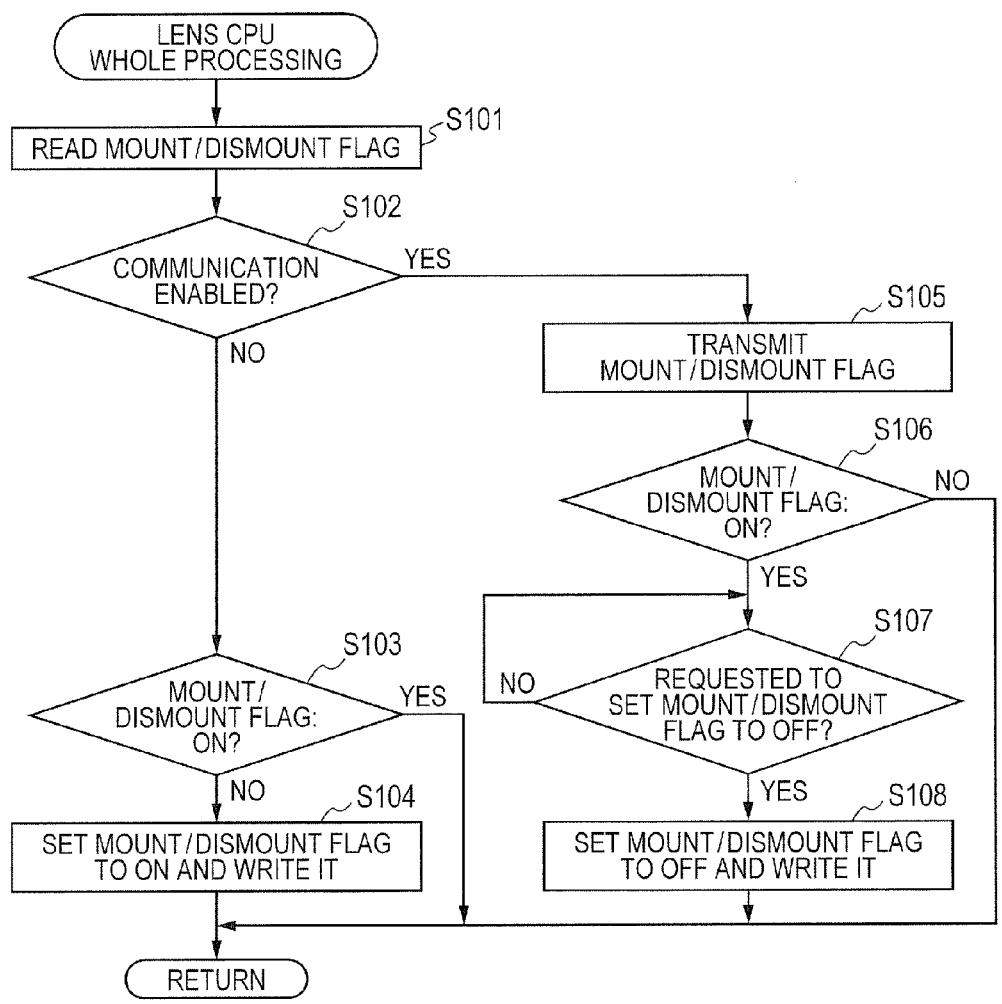
FIG. 3 is a flow chart of whole processing in a lens CPU 111 according to the first embodiment.

Next, the software processing performed by the lens CPU 111 is described. FIG. 3 is a flow chart of whole processing performed by the lens CPU 111 according to the first embodiment.

First, in Step S101, a mount/dismount flag stored in the EEPROM 112 is read. The mount/dismount flag is a flag for determining whether or not the accessory unit 2 is mounted and dismounted to and from the lens unit 1, namely, whether or not the accessory unit 2 is dismounted from the lens unit 1 after predetermined settings are performed, or whether or not the accessory unit 2 for which predetermined settings are not performed is mounted to the lens unit 1. An initial value of the mount/dismount flag is ON, which means that the accessory unit 2 is mounted and dismounted to and from the lens unit 1. Subsequently, in Step S102, it is confirmed whether or not the communication to and from the accessory unit 2 is enabled. A confirmation method in this step is to transmit specific data to the accessory unit 2 and confirm whether or not response data is returned from the accessory unit 2.

When the communication to and from the accessory unit 2 is not enabled, it is determined that the accessory unit 2 is dismounted from the lens unit 1, and in Step S104, the CPU 111 (mount determiner) sets the mount/dismount flag, which is mount information, to ON and writes the mount/dismount flag into the EEPROM 112 (mount memory). Note that, when the mount/dismount flag obtained in Step S101 is ON, there is no need to write the mount/dismount flag into the EEPROM, and hence the processing of Step S104 is omitted.

On the other hand, when the communication to and from the accessory unit 2 is enabled, the procedure proceeds to Step S105, and the CPU 111 transmits the mount/dismount flag to the accessory unit 2. Then, when the mount/dismount flag is ON, the CPU 111 waits until a request to set the mount/dismount flag to OFF is received through communication from the accessory unit 2. When the request is received, the mount/dismount flag is set to OFF and stored in the EEPROM 112.

Figure 4:
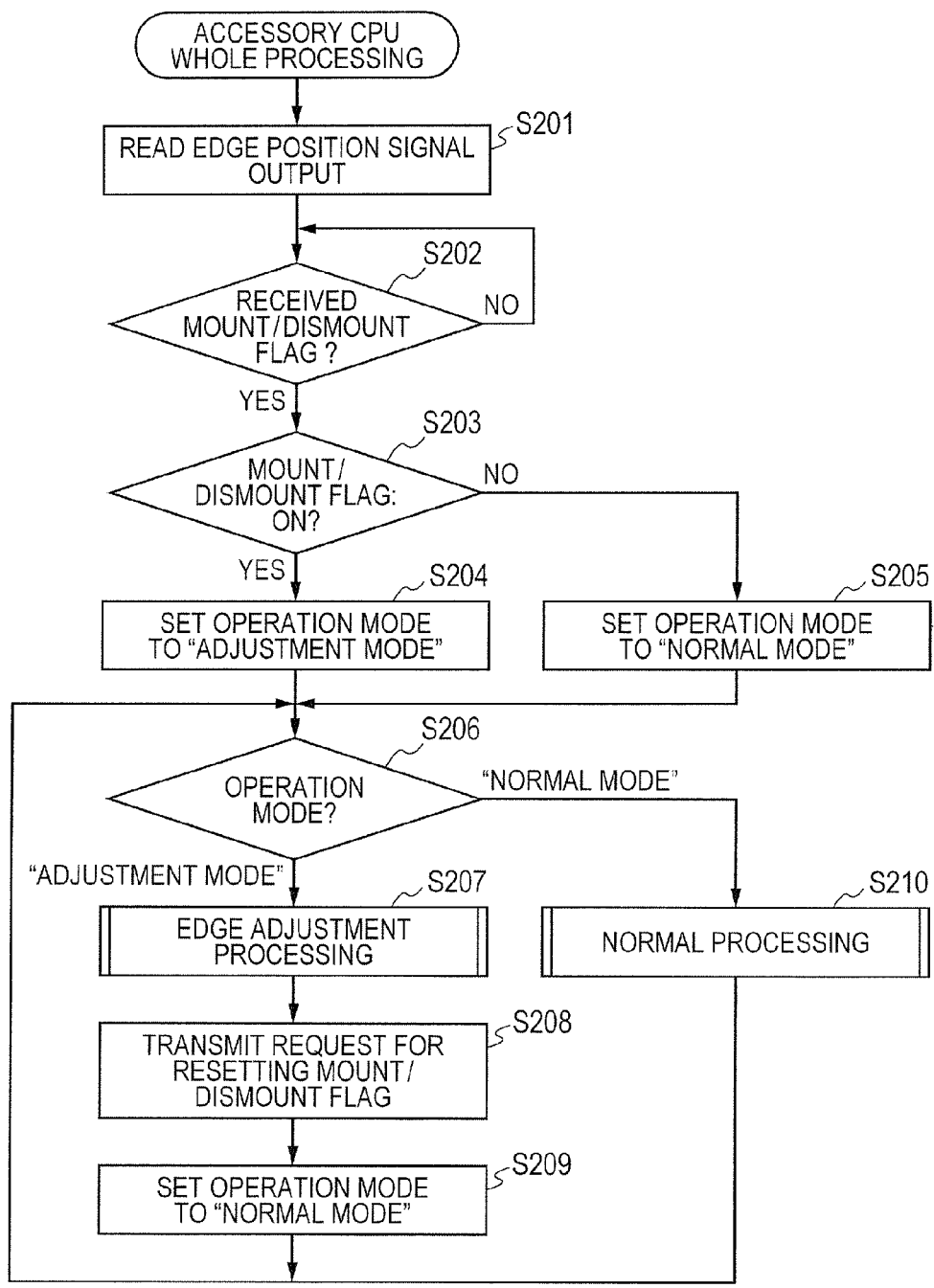
FIG. 4 is a flow chart of whole processing in an accessory CPU 211 according to the first embodiment.

Subsequently, the software processing performed by the accessory CPU 211 is described. FIG. 4 is a flow chart of whole processing performed by the accessory CPU 211 according to the first embodiment.

First, an edge position output signal is read from the EEPROM 212 (reference memory). The edge position output signal indicates an output signal of the stop position detector 203 at the time when the stop is located at a close end or an open end, and an output signal of the focus position detector 206 at the time when the focus is located at a near end or an infinity end. In other words, the edge position output signal is an output signal (reference position signal) of the first position detector at the time when the movable optical element is located at a position serving as a reference position. This edge position output signal is stored in edge adjustment processing to be described later, and is used in normal processing to be described later.

Next, the CPU 211 (mode setter) waits until the mount/dismount flag is received from the lens unit 1. When the received mount/dismount flag is ON, the CPU 211 sets the operation mode to "adjustment mode", and when the received mount/dismount flag is OFF, the CPU 211 sets the operation mode to "normal mode".

Subsequently, the procedure proceeds to Step S206, and when the operation mode is "adjustment mode", the edge adjustment processing is performed until edge adjustment is finished. The edge adjustment processing is described later in detail. When the edge adjustment is finished, the procedure proceeds to Step S208, and the CPU 211 transmits a request for setting the mount/dismount flag to OFF to the lens unit 1, and sets the operation mode to "normal mode".

When the operation mode is "normal mode" in Step S206, the CPU 211 performs the normal processing. The normal processing is also described later in detail.

Figure 5:
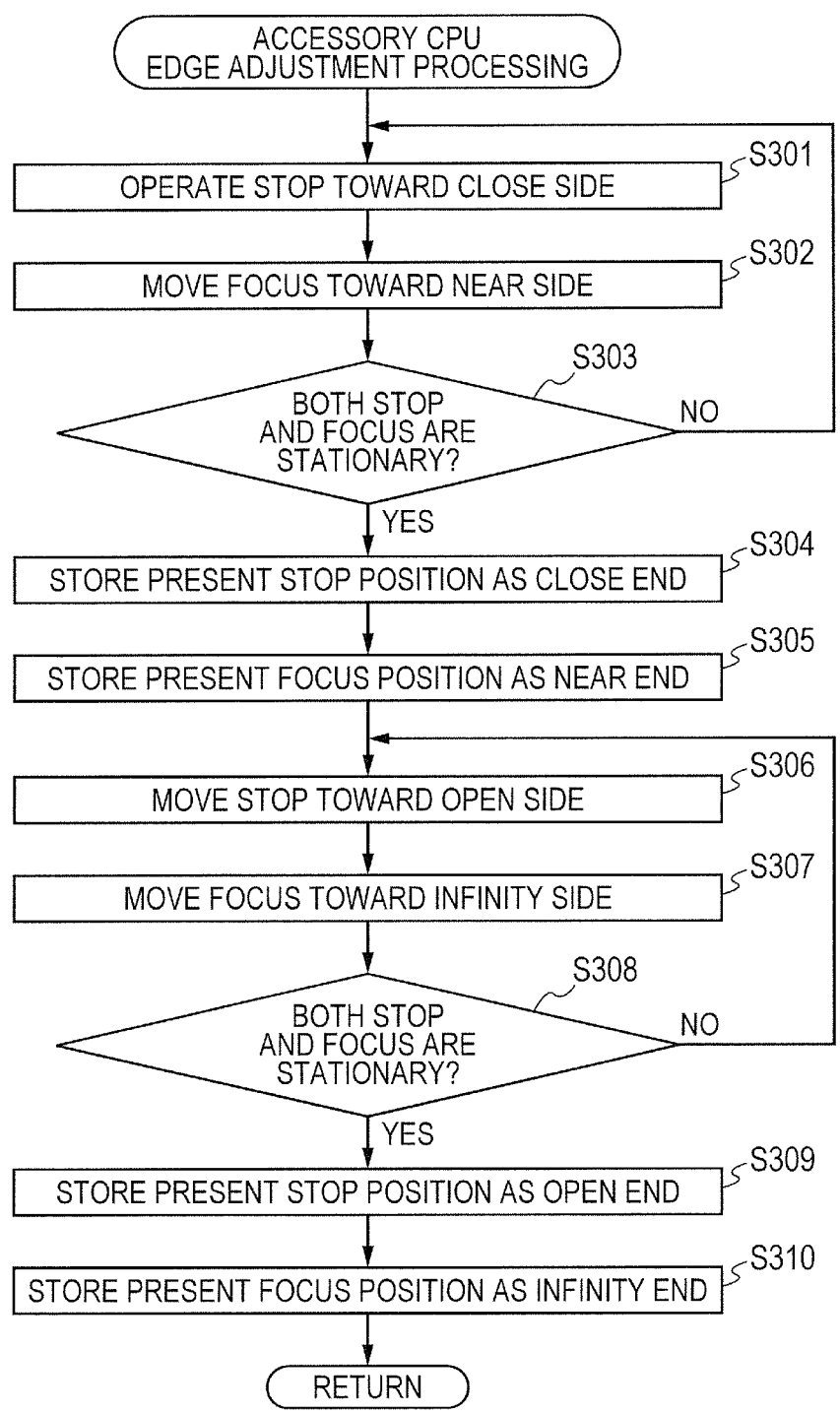
FIG. 5 is a flow chart of edge adjustment processing in the accessory CPU 211 according to first, second, and fourth embodiments of the present invention.

The edge adjustment processing of Step S207 is now described in detail. FIG. 5 is a flow chart of the edge adjustment processing performed by the accessory CPU 211 according to the first embodiment.

First, in Step S301 and Step S302, the CPU 211 outputs drive signals so that the stop motor 201 is driven toward the close side and the focus motor 204 is driven toward the near side. This operation is repeated until the stop and the focus are stationary, that is, until the stop reaches the close end and the focus reaches the near end. Whether or not the stop or the focus is stationary is determined based on whether or not a signal from the stop position detector 203 or the focus position detector 206 remains unchanged for 1 second.

When the stop and the focus are both stationary, the procedure proceeds to Step S304 and Step S305. In Step S304 and Step S305, the output signal (reference position signal) of the stop position detector 203 in the stationary state and the output signal of the focus position detector 206 in the stationary state are stored in the EEPROM 212 (reference memory) as a close end output signal $X1c$ and a near end output signal $X2n$, respectively.

In Step S306 to Step S310, the stop is driven toward the open side and the focus is driven toward the infinity side, and the output signals (reference position signals) of the position detectors in the stationary states are stored in the EEPROM 212 (reference memory) as an open end output signal $X1o$ and an infinity end output signal $X2f$, respectively.

Figure 6:
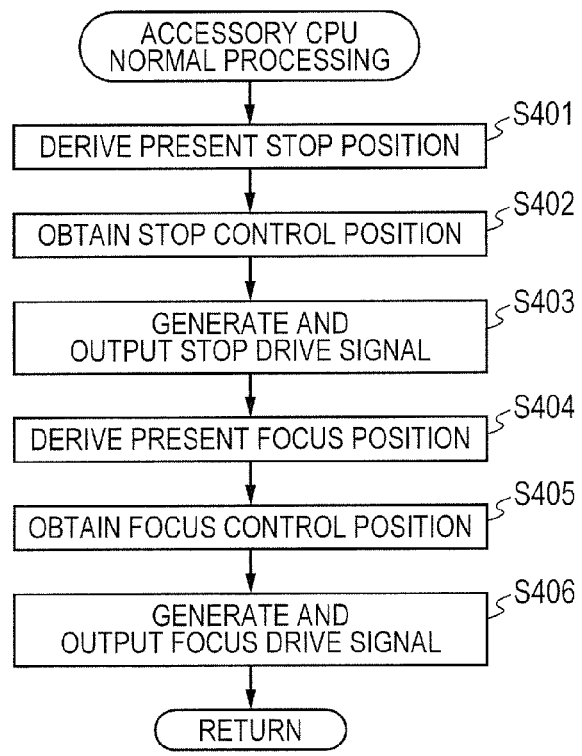
FIG. 6 is a flow chart of normal processing in the accessory CPU 211 according to the first, second, and fourth embodiments.

The normal processing of Step S210 is described in detail. FIG. 6 is a flow chart of the normal processing performed by the accessory CPU 211 according to the first embodiment.

Figure 7:
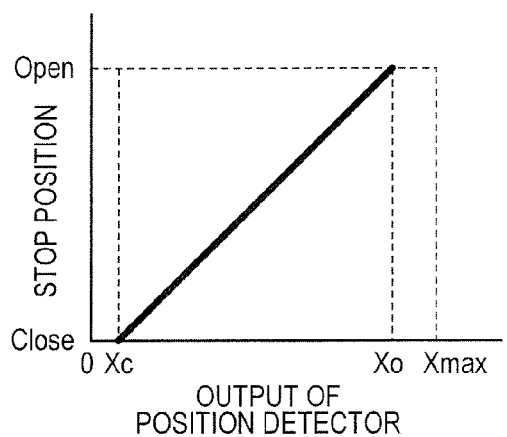
FIG. 7 is a graph for showing a method of deriving a stop position when $X1c < X1o$ is established.
Figure 8:
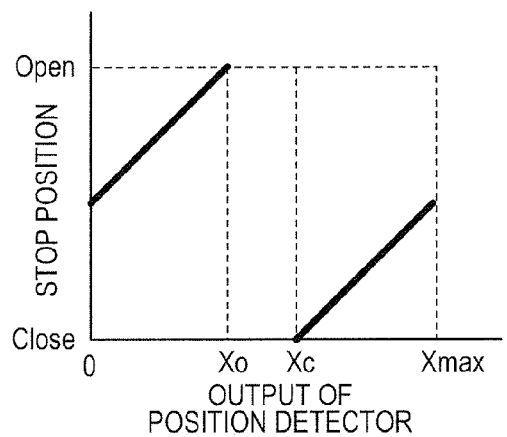
FIG. 8 is a graph for showing a method of deriving a stop position when $X1c \geq X1o$ is established.

In Step S401, the CPU 211 (position deriver) derives a stop position I based on the output signal X1, the close end output signal $X1c$, and the open end output signal $X1o$ of the stop position detector 203. A derivation method is as shown in FIG. 7 when $X1c<X1o$ is established, and as shown in FIG. 8 when $X1c \geq X1o$ is established. In Step S402, the CPU 211 obtains a stop control position Ic from a stop controller (not shown). In Step S403, the CPU 211 derives a stop drive signal based on the stop position I and the stop control position Ic, and outputs the derived stop drive signal. A method of deriving the stop drive signal in this step is based on commonly-used PID control, and a detailed description thereof is omitted.

In Step S404 to Step S406, the CPU 211 derives a focus position F similarly to the stop, and derives and outputs a focus drive signal so that the focus is controlled to a focus control position Fc transmitted from a focus controller (not shown).

The effects in this embodiment are described.

Hitherto, when the accessory unit 2 is dismounted from the lens unit 1 and is mounted to the lens unit 1 again, it is necessary for a user to perform edge adjustment through complicated button operations or the like. Accordingly, it is necessary for the user to perform complicated button operations while reading an instruction manual, and the user may not figure out how to perform the edge adjustment and fail to perform the edge adjustment, or it takes time for the edge adjustment. Further, there is a high risk that the user may not determine whether or not the edge adjustment is needed, and there is another risk that the lens system may be used in the state in which the edge adjustment is not performed. As a result, there are problems in that inaccurate position data may be stored in a video signal as metadata, or the stop or the focus may not be controlled to an intended position.

However, in this embodiment, whether or not the accessory unit 2 having the position detection function is dismounted from the lens unit 1 including the optical element is detected based on whether or not the communication between the lens unit 1 and the accessory unit 2 is enabled, and the result of detection is stored in the lens unit 1. Then, when the accessory unit 2 is dismounted from the lens unit 1 once and is mounted to the lens unit 1 again, the accessory unit 2 is notified that the accessory unit 2 has been dismounted from the lens unit 1, and the accessory unit 2 automatically performs the edge adjustment. In this manner, when the accessory unit is mounted and dismounted to and from the lens unit, the edge adjustment is automatically performed. Thus, the user is not required to perform cumbersome operations, and there is no risk that the user may forget to perform the edge adjustment.

Note that, the movable optical elements included in the lens system according to this embodiment are only the stop and the focus, but the present invention is also applicable when the zoom is added as the movable optical element.

Second Embodiment

Figure 9:
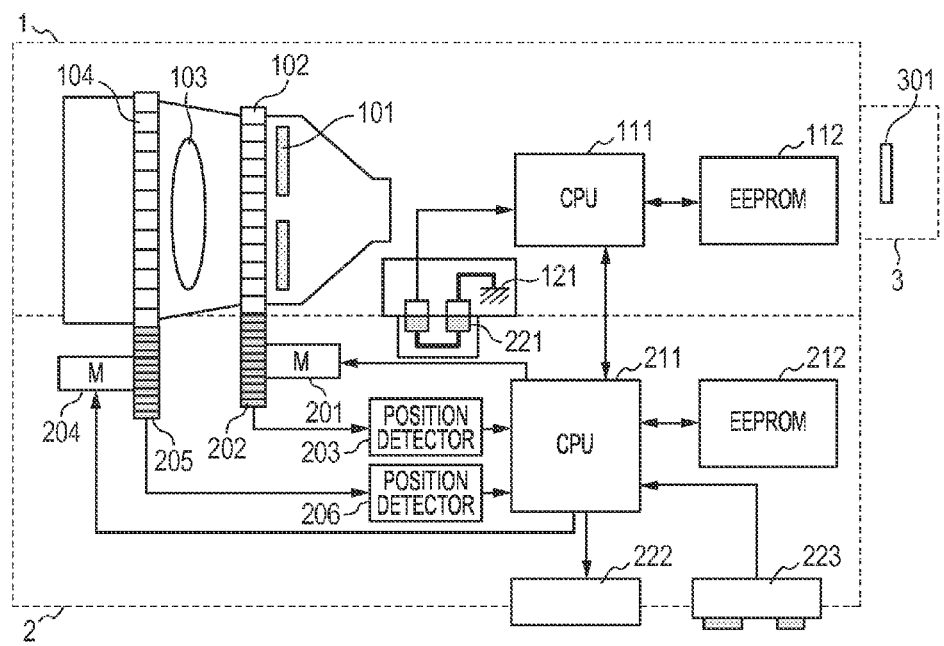
FIG. 9 is a block diagram of a lens system according to the second embodiment of the present invention.

FIG. 9 is an illustration of configurations of a lens system and an image pickup apparatus including the lens system according to a second embodiment of the present invention. Further, the lens system according to the present invention and the image pickup unit 3 including the image pickup apparatus 301 configured to receive light from the lens system can be used together to construct an image pickup apparatus including the lens system according to the present invention.

In this embodiment, a configuration in which a contact member is used to perform mount/dismount determination, and after the mount/dismount determination is performed, a user is warned of edge adjustment is described.

The description of the same configurations as those in the first embodiment is omitted, and only a newly added configuration is described.

The detailed configuration of the lens unit 1 is described.

A lens-side contact member 121 is a contact member configured to detect whether or not the accessory unit 2 is mounted to the lens unit 1 based on whether or not the accessory unit 2 is electrically connected to the lens unit 1. The detected signal is input to the CPU 111.

Next, the detailed configuration of the accessory unit 2 is described.

An accessory-side contact member 221 is a member to be connected to the lens-side contact member 121, and recognizes that the accessory unit 2 is mounted to the lens unit 1 when the two contact members are connected to each other.

Figure 10:
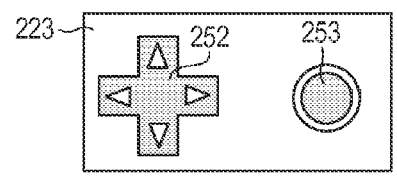
FIG. 10 is a diagram for illustrating a configuration of an operation member 223.

A display member 222 is a member configured to display a character, a figure, or the like to the user, and updates a displayed character, figure, or the like in response to an output signal of the CPU 211. Further, an operation member 223 is an operation member used for the user to operate various kinds of functions of the lens system, and is constructed with a directional switch and a push switch as illustrated in FIG. 10. The operation states of the switches are input to the CPU 211.

Figure 11:
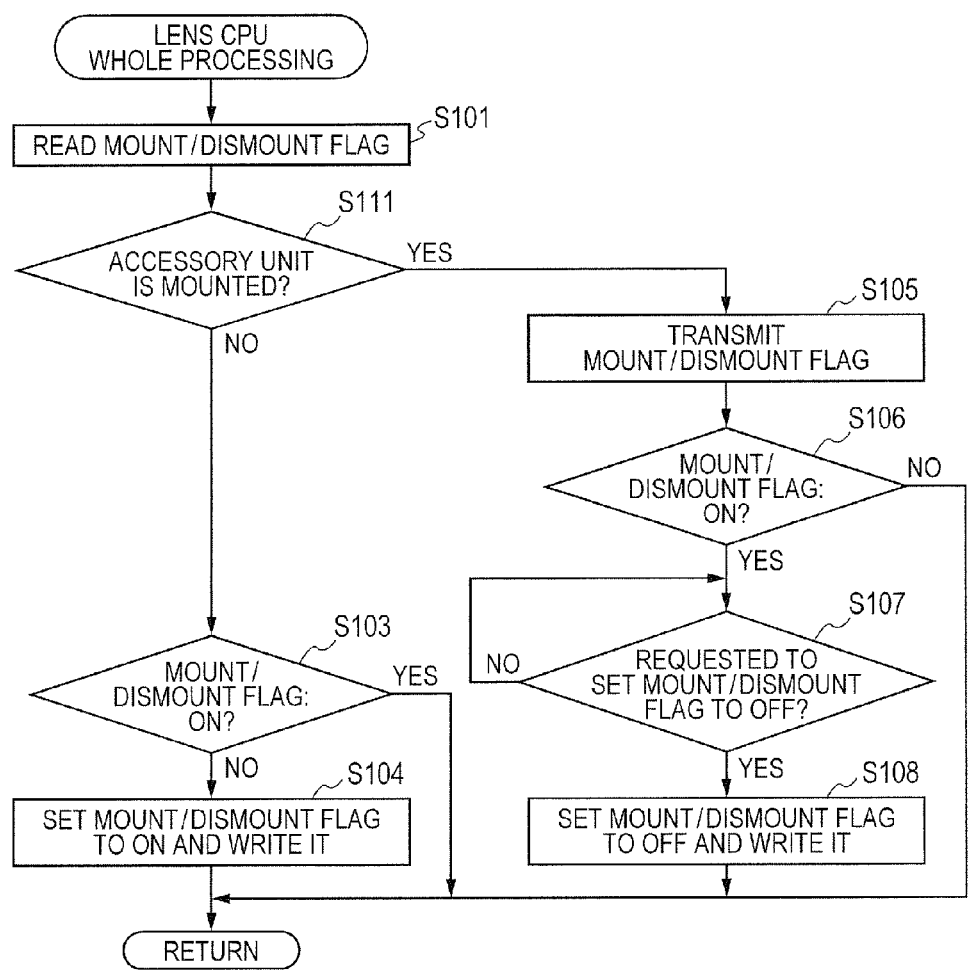
FIG. 11 is a flow chart of whole processing in a lens CPU 111 according to the second embodiment.

The software processing performed by the lens CPU 111 is described. FIG. 11 is a flow chart of whole processing performed by the lens CPU 111 according to the second embodiment.

Step S101 and Step S103 to Step S108 are the same as those in the first embodiment, and hence a description thereof is omitted.

In Step S111, it is determined whether or not the accessory unit 2 is mounted based on an electric signal from the lens-side contact member 121. When it is determined that the accessory unit 2 is not mounted, the procedure proceeds to Step S103. When it is determined that the accessory unit 2 is mounted, the procedure proceeds to Step S105.

Figure 12:
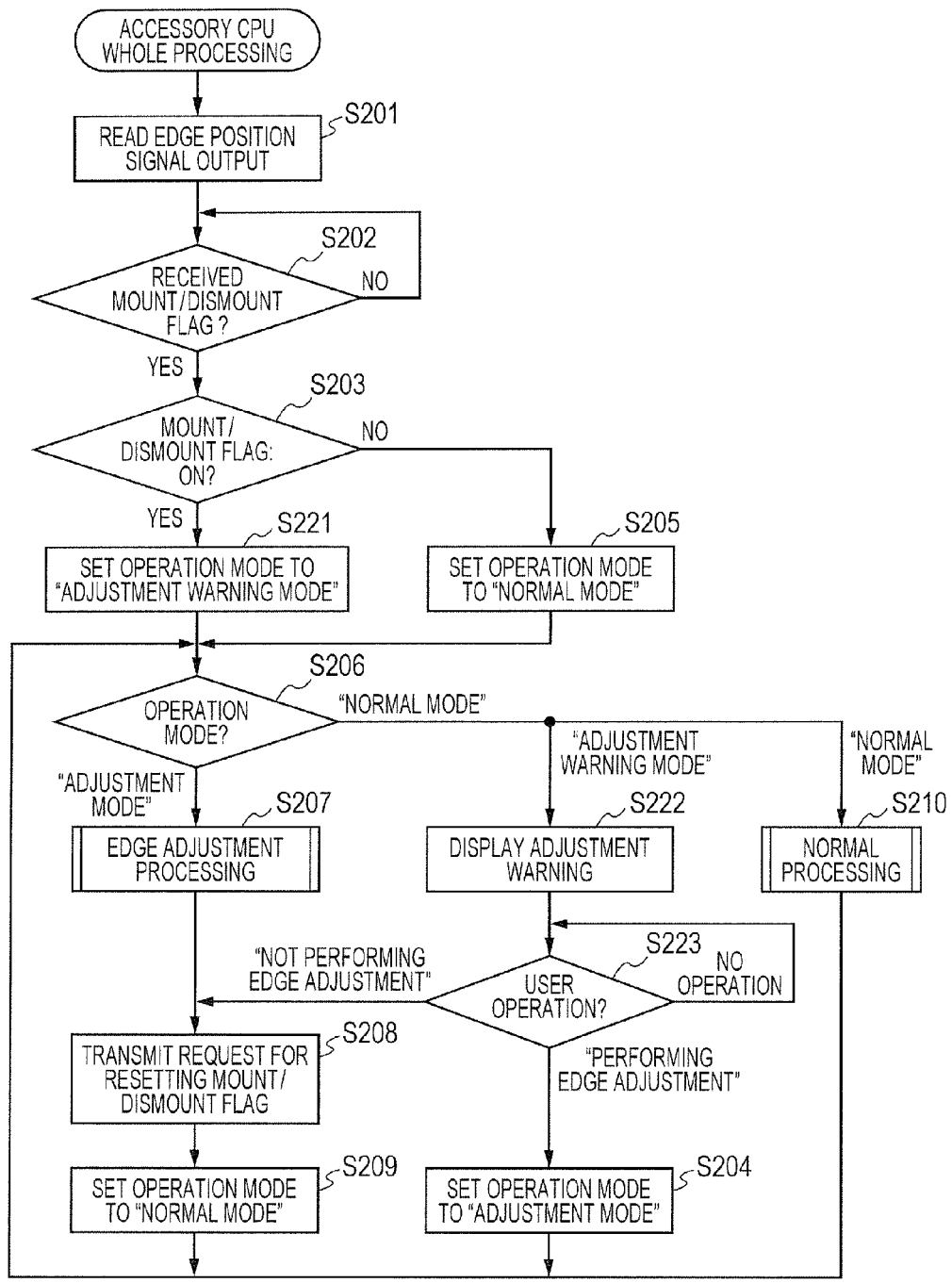
FIG. 12 is a flow chart of whole processing in an accessory CPU 211 according to the second embodiment.

The software processing performed by the accessory CPU 211 is described. FIG. 12 is a flow chart of whole processing performed by the accessory CPU 211 according to the second embodiment.

Step S201 to Step S210 are the same as those in the first embodiment, and hence a description thereof is omitted.

When the mount/dismount flag received in Step S202 is ON, the procedure proceeds to Step S221, where the operation mode is set to "adjustment warning mode".

Figure 13:
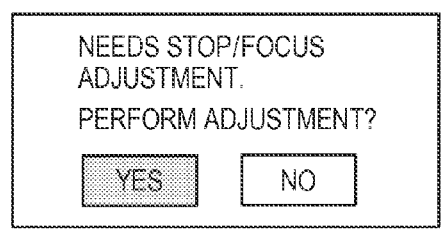
FIG. 13 is a diagram for illustrating an example of adjustment warning display.

When the operation mode is "adjustment warning mode" in Step S206, the procedure proceeds to Step S222, and as shown in an example of FIG. 13, the user is notified that the edge adjustment needs to be performed, and such a screen that allows the user to perform the edge adjustment with a simple operation (predetermined operation) is displayed. In Step S223, the procedure waits until the user performs an operation, and when the user operates the operation member 223 so that the edge adjustment is performed, the CPU 211 (mode setter) sets the operation mode to "adjustment mode". On the other hand, when the user operates the operation member 223 in Step S223 so that the edge adjustment is not performed, the procedure proceeds to Step S208 and Step S209, and the CPU 211 (mode setter) transmits a request for setting the mount/dismount flag to OFF to the lens unit 1, and sets the operation mode to "normal mode".

The effects in this embodiment are described.

According to this embodiment, the contact member is used to detect whether or not the accessory unit 2 having the position detection function is electrically dismounted from the lens unit 1 including the optical element, and the result of detection is stored in the lens unit 1. Then, when the accessory unit 2 is dismounted from the lens unit 1 once and is mounted to the lens unit 1 again, the accessory unit 2 is notified that the accessory unit 2 has been dismounted from the lens unit 1, and the accessory unit 2 notifies the user that the edge adjustment needs to be performed, and further, the edge adjustment can be performed with simple operation. Consequently, similarly to the first embodiment, the user can perform the edge adjustment without the need of cumbersome operations, and there is no risk that the user may forget to perform the edge adjustment.

Further, in the first embodiment, it is determined whether or not the accessory unit 2 is dismounted from the lens unit 1 based on whether or not the communication is enabled, and hence the first embodiment does not assume the case where different power supplies are used for the lens unit 1 and the accessory unit 2 and only the lens unit 1 is powered on. In this case, the communication is not established, and hence even when the accessory unit 2 is not dismounted from the lens unit 1, it is determined that the accessory unit 2 is dismounted from the lens unit 1, and the edge adjustment is performed.

According to this embodiment, the contact member is used to determine whether or not the accessory unit 2 is dismounted from the lens unit 1, and hence the mount/dismount determination can be accurately performed even when only the lens unit 1 is powered on.

Incidentally, in the first embodiment, the mount/dismount determination is performed based on whether or not the communication is enabled, and the adjustment operation after the mount/dismount determination is the automatic edge adjustment, and in the second embodiment, the mount/dismount determination is performed based on the contact member, and the adjustment operation after the mount/dismount determination is the adjustment warning display. However, the mount/dismount determination and the adjustment operation after the mount/dismount determination are independent of each other, and hence the adjustment warning may be displayed after the mount/dismount determination is performed based on whether or not the communication is enabled, or in contrast, the edge may be automatically adjusted after the mount/dismount determination is performed based on the contact member.

Third Embodiment

Figure 14:
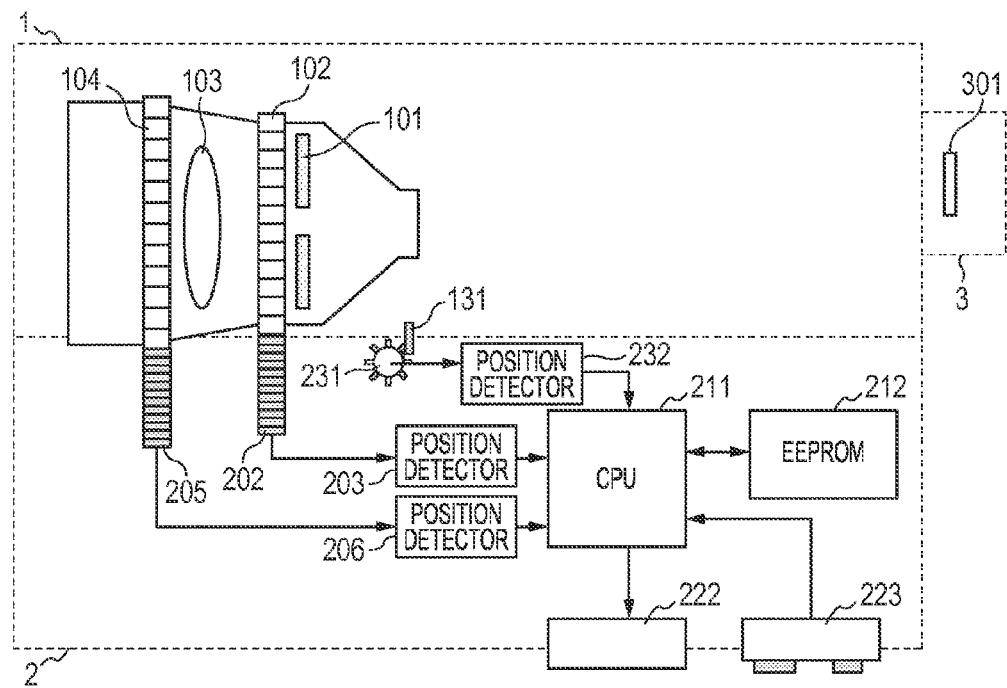
FIG. 14 is a block diagram of a lens system according to a third embodiment of the present invention.

FIG. 14 is an illustration of configurations of a lens system and an image pickup apparatus including the lens system according to a third embodiment of the present invention. Further, the lens system according to the present invention and the image pickup unit 3 including the image pickup apparatus 301 configured to receive light from the lens system can be used together to construct an image pickup apparatus including the lens system according to the present invention.

In this embodiment, a configuration in which a rotating member of the accessory unit 2 is used to perform a mount/dismount determination, and after the mount/dismount determination is performed, a user manually performs the edge adjustment is described. The description of the same configurations as those in the first and second embodiments is omitted, and only a newly modified configuration is described.

The detailed configuration of the lens unit 1 is described.

In this embodiment, unlike the first and second embodiments, the lens unit 1 does not include the CPU 111 and the EEPROM 112, and has no electrical configuration requiring a power supply.

A rotating pin 131 is a mechanical pin fixed to the lens unit 1, and is configured to rotate a mount/dismount rotating member 231 to be described later.

Next, the detailed configuration of the accessory unit 2 is described.

The mount/dismount rotating member 231 (mount/dismount detecting member) is a rotating member configured to rotate by the rotating pin 131 when the accessory unit 2 is mounted to the lens unit 1. The mount/dismount rotating member 231 rotates in one direction step by step every time the accessory unit 2 is mounted to the lens unit 1. The amount of rotation is detected by a mount/dismount rotation position detector 232, and the detected signal is input to the CPU 211 as a mount/dismount rotation position. Note that, in this embodiment, the mount/dismount rotating member is configured to rotate every time the accessory unit 2 is mounted to the lens unit 1, but it is only necessary that a detectable physical amount of the mount/dismount rotating member be changed every time the mount/dismount are repeated. The mount/dismount rotating member may be configured to rotate every time the accessory unit 2 is dismounted from the lens unit 1, and the configuration is not limited to the rotation.

Further, in this embodiment, the accessory unit 2 does not include the stop motor 201 or the focus motor 204, and does not electrically control the stop and the focus but only detects the position, to thereby output position information on the stop and the focus to an external apparatus (not shown).

Figure 15:
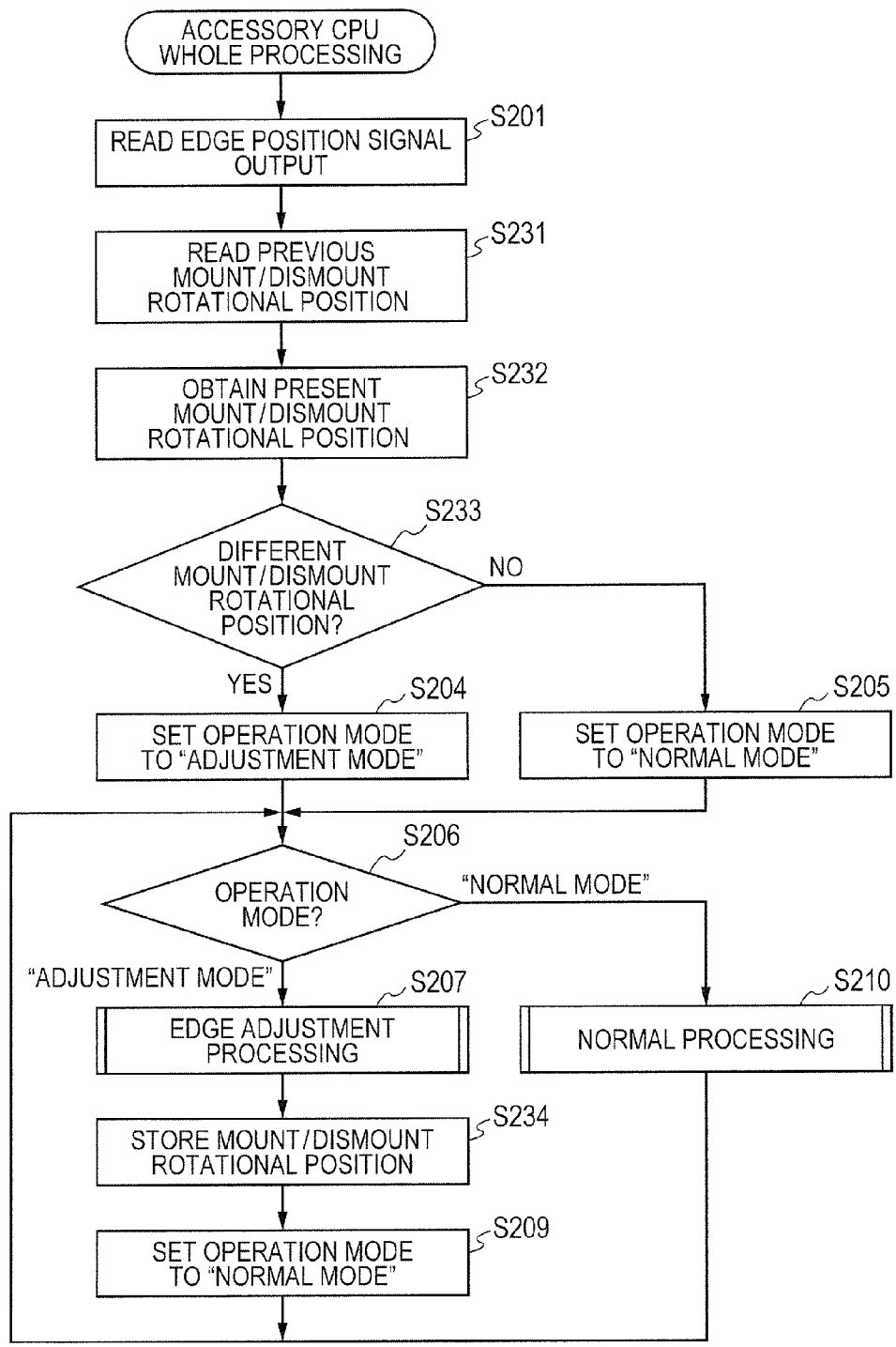
FIG. 15 is a flow chart of whole processing in an accessory CPU 211 according to the third embodiment.

The software processing performed by the accessory CPU 211 is described. FIG. 15 is a flow chart of whole processing performed by the accessory CPU 211 according to the third embodiment.

In Step S201, an edge position output signal is read from the EEPROM 212 (reference memory). Then, in Step S231, a mount/dismount rotation position (physical amount) that is stored when the previous edge adjustment is performed is read from the EEPROM 212 (mount/dismount detection memory). Then, a present mount/dismount rotation position is obtained from the mount/dismount rotation position detector 232, and it is determined whether or not there is a difference between the two mount/dismount rotation positions. When there is a difference between the mount/dismount rotation positions, the CPU 211 (mode setter) recognizes that the accessory unit 2 has been dismounted from the lens unit 1 at least once after the edge adjustment is performed, and sets the operation mode to "adjustment mode". On the other hand, when there is no difference between the mount/dismount rotation positions in Step S233, the CPU 211 (mode setter) recognizes that the accessory unit 2 has not been dismounted from the lens unit 1 after the edge adjustment is performed, and sets the operation mode to "normal mode".

When the operation mode is "adjustment mode", the procedure proceeds to Step S207, where the edge adjustment processing is performed, and after the adjustment is finished, the present mount/dismount rotation position is written into the EEPROM 212 (mount/dismount detection memory).

Figure 16:
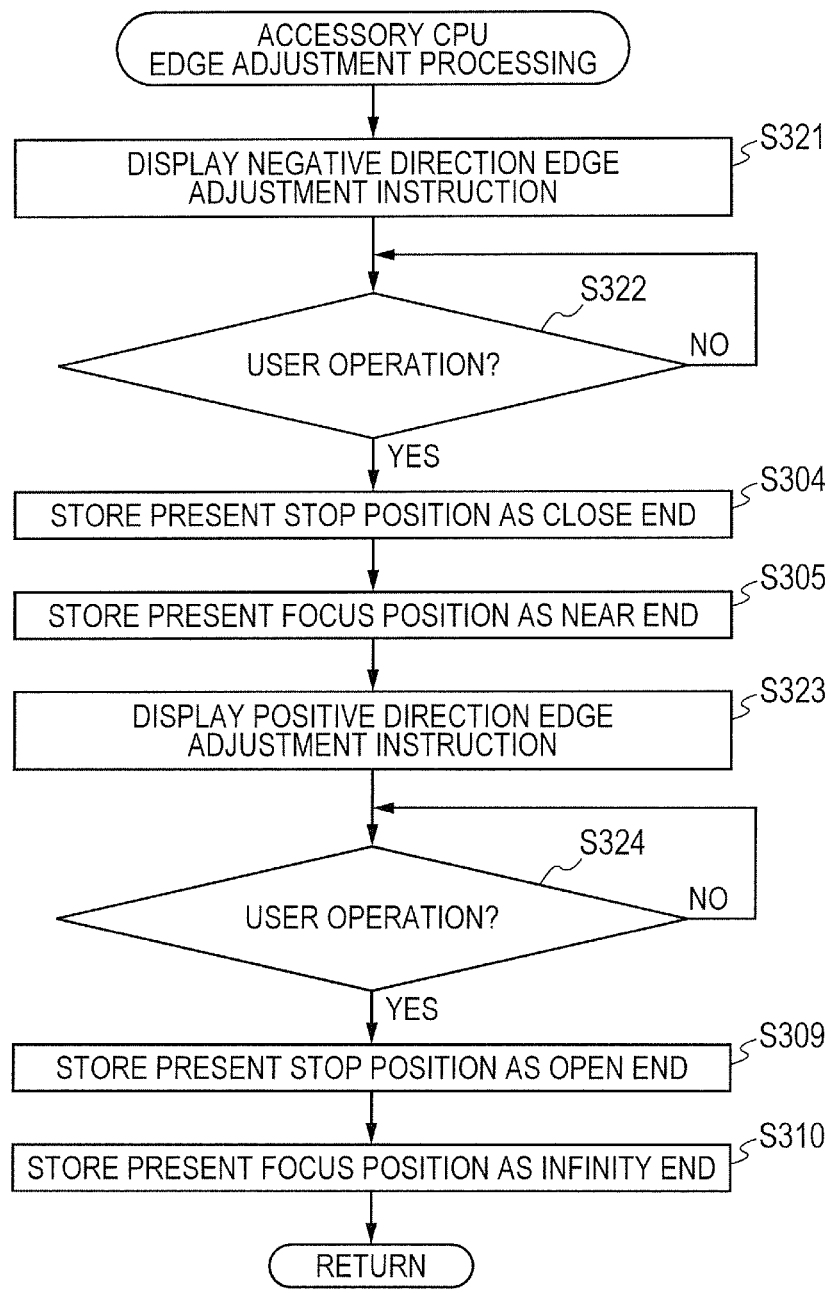
FIG. 16 is a flow chart of edge adjustment processing in the accessory CPU 211 according to the third embodiment.

The edge adjustment processing of Step S207 is described in detail. FIG. 16 is a flow chart of the edge adjustment processing performed by the accessory CPU 211 according to the third embodiment. In this embodiment, the stop motor and the focus motor are eliminated, and hence FIG. 16 is an edge adjustment flow chart performed manually by the user.

Figure 17:
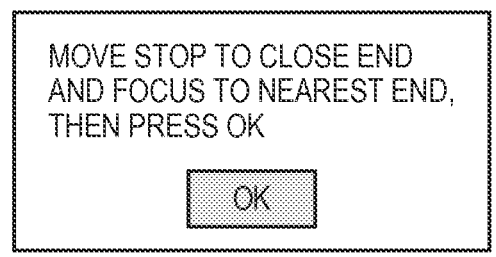
FIG. 17 is a diagram for illustrating an example of negative direction edge adjustment instruction display.

First, in Step S321, a negative direction edge adjustment instruction as shown in an example of FIG. 17 is displayed on the display member 222. Then, the procedure waits for the user's operation, and the processing of Step S304 and Step S305 is performed to store the close end output signal X1c and the near end output signal X2n in the EEPROM 212 (reference memory).

Figure 18:
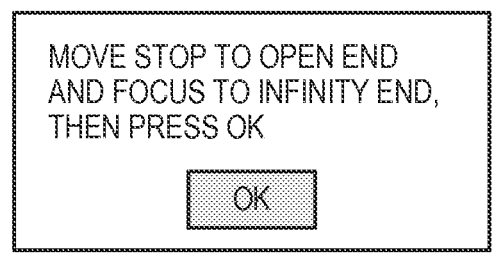
FIG. 18 is a diagram for illustrating an example of positive direction edge adjustment instruction display.

Subsequently, in Step S323, a positive direction edge adjustment instruction as shown in an example of FIG. 18 is displayed on the display member 222. Similarly, the procedure waits until the user performs a predetermined operation, and the processing of Step S309 and Step S310 is performed to store the open end output signal X1o and the infinity end output signal X2f in the EEPROM 212 (reference memory).

Figure 19:
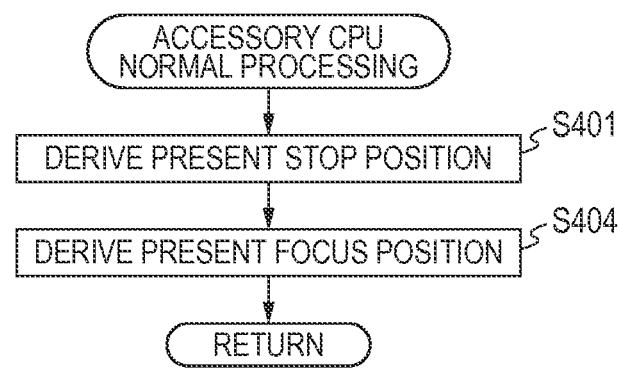
FIG. 19 is a flow chart of normal processing in the accessory CPU 211 according to the third embodiment.

The normal processing of Step S210 is described in detail. FIG. 19 is a flow chart of the normal processing performed by the accessory CPU 211 according to the third embodiment. In this embodiment, the stop motor and the focus motor are eliminated, and hence only the processing of Step S401 and Step S404 is performed to detect the stop position and the focus position.

The effects in this embodiment are described.

According to this embodiment, the mount/dismount rotating member is used so that the accessory unit 2 directly detects whether or not the accessory unit 2 having the position detection function is dismounted from the lens unit 1 including the optical element once and is mounted to the lens unit 1 again. Then, when the accessory unit 2 is dismounted from the lens unit 1 once and is mounted to the lens unit 1 again, the edge adjustment can be performed with simple operation. Consequently, similarly to the first and second embodiments, the user is not required to perform cumbersome operations, and there is no risk that the user may forget to perform the edge adjustment.

Further, unlike the first and second embodiments, the accessory unit 2 can directly detect the mount/dismount, and hence no complicated configuration is required on the lens unit side.

Further, in the first and second embodiments, in order to store that the accessory unit 2 is dismounted from the lens unit 1, the lens unit 1 needs to be powered on at least once after the accessory unit 2 is dismounted from the lens unit 1. However, according to this embodiment, the mount/dismount rotating member mechanically stores whether or not the accessory unit 2 is dismounted from the lens unit 1, and hence even when the accessory unit 2 is dismounted from the lens unit 1 in a state in which the lens unit 1 and the accessory unit 2 are not powered on, it can be recognized whether or not the accessory unit 2 is dismounted from the lens unit 1 at least once.

Note that, similarly to the second embodiment, the mount/dismount determination and the adjustment operation after the mount/dismount determination are independent of each other, and hence the third embodiment may be combined with the mount/dismount determination or the adjustment operation after the mount/dismount determination in the first embodiment or the second embodiment.

Fourth Embodiment

Figure 20:
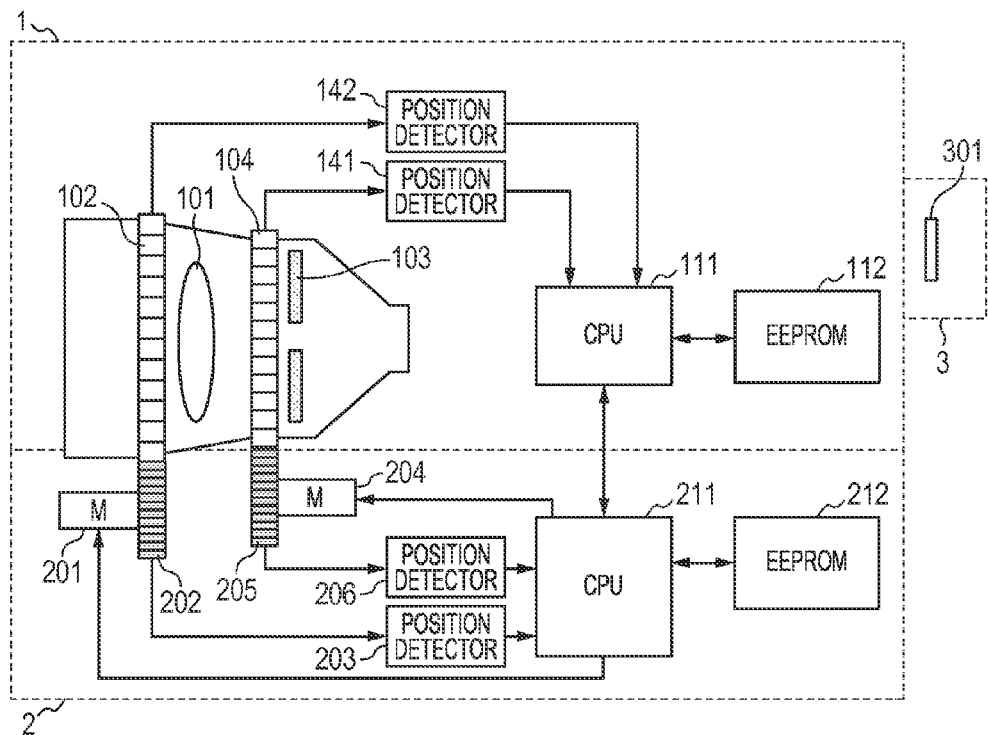
FIG. 20 is a block diagram of a lens system according to the fourth embodiment of the present invention.

FIG. 20 is an illustration of configurations of a lens system and an image pickup apparatus including the lens system according to a fourth embodiment of the present invention. Further, the lens system according to the present invention and the image pickup unit 3 including the image pickup apparatus 301 configured to receive light from the lens system can be used together to construct an image pickup apparatus including the lens system according to the present invention. In this embodiment, a configuration in which the lens unit 1 also includes position detectors for the stop and the focus is described. The description of the same configurations as those in the first, second, and third embodiments is omitted, and only a newly modified configuration of the lens unit 1 is described.

A lens-side stop position detector 141 and a lens-side focus position detector 142 are configured in the lens unit 1, and are position detectors (second detectors) configured to directly detect positions of the focus operation ring 104 and the stop operation ring 102, respectively. The detected position signals are input to the CPU 111.

Figure 21:
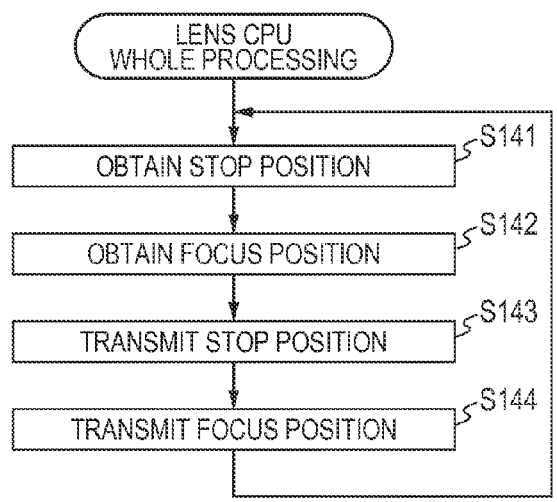
FIG. 21 is a flow chart of whole processing in a lens CPU 111 according to the fourth embodiment.

The software processing performed by the lens CPU 111 is described. FIG. 21 is a flow chart of whole processing performed by the lens CPU 111 according to the fourth embodiment.

The processing performed by the lens CPU 111 according to this embodiment is very simple, and only transmits the stop position and the focus position respectively obtained from the lens-side stop position detector 141 and the lens-side focus position detector 142, which are lens unit position detectors, to the accessory unit 2.

Figure 22:
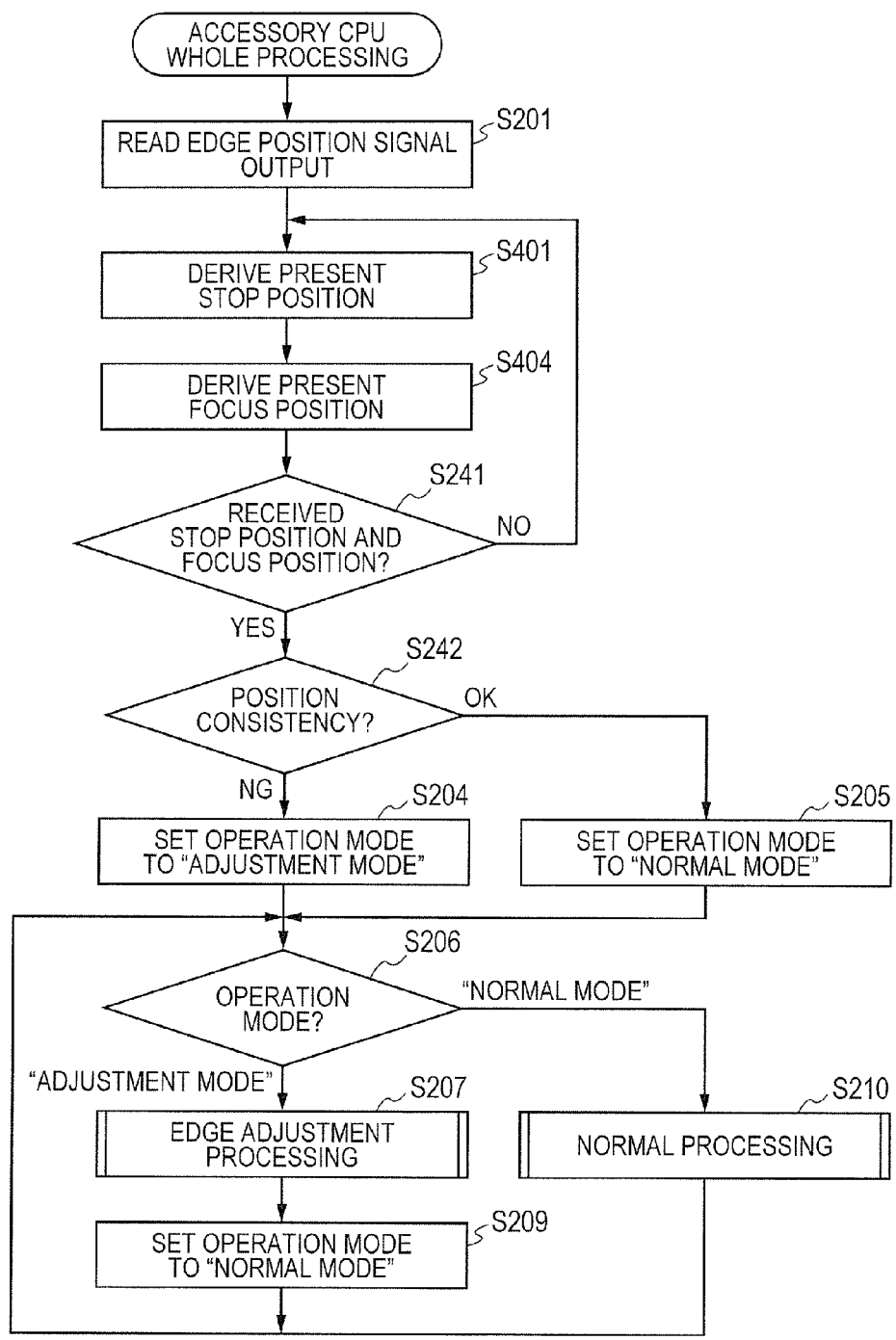
FIG. 22 is a flow chart of whole processing in an accessory CPU 211 according to the fourth embodiment.

The software processing performed by the accessory CPU 211 is described. FIG. 22 is a flow chart of whole processing performed by the accessory CPU 211 according to the fourth embodiment.

First, an edge position output signal is read from the EEPROM 212 (reference memory), and then the procedure proceeds to Step S401 and Step S402, where the present stop position and the present focus position are derived by the above-mentioned derivation method. In Step S241, it is determined whether or not the stop position and the focus position are received from the lens unit 1. When the stop position and the focus position are not received, Step S401 and Step S402 are repeated again.

When the stop position and the focus position are received from the lens unit 1, it is confirmed whether or not there is consistency between the received stop position and the stop position derived in Step S401 and whether or not there is consistency between the received focus position and the focus position derived in Step S402. When there is no consistency in the stop position or in the focus position, the CPU 211 (mode setter) recognizes that the stop position or the focus position derived by the accessory unit 2 is inaccurate, that is, the accessory unit 2 has been dismounted from the lens unit 1 at least once, and sets the operation mode to "adjustment mode". When there is consistency both in the stop position and in the focus position, the CPU 211 sets the operation mode to "normal mode". Note that, whether or not there is consistency in position is determined based on a determination as to whether or not the position derived by the accessory unit 2 falls within a range derived based on the position obtained by the lens unit 1, the resolution of each position detector, a detection error, or the like.

Step S206 to Step S210 are the same as those in the first embodiment, and hence a description thereof is omitted.

In this embodiment, an example is disclosed in which the detector configured to detect a position signal corresponding to a position of the optical element, the reference memory configured to store the reference position signal, and the unit configured to determine mount/dismount of the lens apparatus and the accessory unit (operation apparatus) are included mainly in the accessory unit. However, the present invention is not limited thereto. The lens apparatus may include all of the above-mentioned components, or the lens apparatus and the accessory unit may share the above-mentioned components. It should be understood that the accessory unit may include all of the above-mentioned components.

Only the determination as to whether or not the accessory unit that was mounted on the lens apparatus when the reference position was stored is dismounted can be the mount/dismount determination of the lens apparatus and the accessory unit (operation apparatus). Conversely, a determination as to whether or not the accessory unit is mounted on another lens apparatus can be the mount/dismount determination.

The effects in this embodiment are described.

In this embodiment, position information on the optical element obtained by the lens unit 1 is used so that the accessory unit 2 having the position detection function directly detects whether or not the accessory unit 2 is dismounted from the lens unit 1 including the optical element once and is mounted to the lens unit 1 again. Then, the edge adjustment can be automatically performed when the accessory unit 2 is dismounted from the lens unit 1 once and is mounted to the lens unit 1 again. Consequently, similarly to the first, second, and third embodiments, the user is not required to perform cumbersome operations, and there is no risk that the user may forget to perform the edge adjustment.

Note that, similarly to the third embodiment, the mount/dismount determination and the adjustment operation after the mount/dismount determination are independent of each other, and hence the fourth embodiment may be combined with the mount/dismount determination or the adjustment operation after the mount/dismount determination in the first embodiment, the second embodiment, or the third embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-136755, filed Jul. 2, 2014, which is hereby incorporated by reference herein in its entirety.

What is claimed is:

1. An operation apparatus, which is mountable and dismountable to and from a lens apparatus comprising an optical element that is movable,
the operation apparatus comprising:
a first detector that detects a position signal corresponding to a position of the optical element in a state in which the operation apparatus is mounted to the lens apparatus;
a reference memory that stores a reference position signal, which is a position signal at a time when the optical element is located at a reference position, in the state in which the operation apparatus is mounted to the lens apparatus;
a determiner that determines whether or not the operation apparatus is dismounted from the lens apparatus after the reference position signal is stored;
a controller that switches between a case where the operation apparatus operates in an adjustment mode in which the reference position signal is stored in the reference memory and a case where the operation apparatus operates in a normal mode in which the reference position signal is not stored, the controller further controlling the operation apparatus to operate in the adjustment mode when the determiner determines that the operation apparatus is dismounted from the lens apparatus after the reference position signal is stored; and
a deriver that derives a position of the optical element based on the position signal and the reference position signal,
wherein, when the operation apparatus operates in the normal mode, the position of the optical element is derived with use of the deriver.

2. The operation apparatus according to claim 1,
wherein the lens apparatus comprises:
a mount determiner that determines whether or not the operation apparatus is mounted to the lens apparatus;
a mount memory that stores mount information indicating whether or not the operation apparatus has been mounted to the lens apparatus; and
a communication unit that notifies the operation apparatus of the mount information stored in the mount memory, and
wherein the determiner determines as to whether or not the operation apparatus is dismounted from the lens apparatus based on the mount information received from the communication unit.

3. The operation apparatus according to claim 2, wherein the mount determiner determines as to whether or not the operation apparatus is mounted to the lens apparatus based on whether or not communication to and from the operation apparatus is available.

4. The operation apparatus according to claim 2,
wherein the lens apparatus further comprises a contact member that is electrically connected to the operation apparatus when the operation apparatus is mounted to the lens apparatus, and
wherein the mount determiner determines as to whether or not the operation apparatus is mounted to the lens apparatus based on whether or not the contact member is electrically connected.

5. The operation apparatus according to claim 1, further comprising:
a mount/dismount detecting member that changes a physical amount thereof every time the lens apparatus is mounted and dismounted to and from the lens apparatus;
a mount/dismount detector that detects the physical amount of the mount/dismount detecting member; and
a mount/dismount detection memory that stores a physical amount that is detected by the mount/dismount detector at a time when the reference position signal is stored,
wherein, when the physical amount obtained from the mount/dismount detector and the physical amount stored in the mount/dismount detection memory are different from each other, the determiner determines that the lens apparatus is dismounted from the lens apparatus after the reference position signal is stored.

6. The operation apparatus according to claim 1,
wherein the lens apparatus comprises:
a second detector that detects a position of the optical element; and
a communication unit that transmits the position of the optical element detected by the second detector to the operation apparatus, and
wherein the mount determiner determines as to whether or not there is consistency between the position of the optical element received from the lens apparatus and the position of the optical element derived by the deriver, and when it is determined that there is no consistency, the mount determiner determines that the operation apparatus is dismounted from the lens apparatus after the reference position signal is stored.

7. The operation apparatus according to claim 1, further comprising an electric driver that electrically drives the optical element,
wherein, when the adjustment mode is set by the controller, the electric driver drives the optical element to the reference position, and a position signal of the first detector at a time when the optical element is located at the reference position is stored as the reference position signal.

8. The operation apparatus according to claim 1, wherein the operation apparatus is allowed to store the reference position signal in response to a predetermined operation by a user in the adjustment mode, and is inhibited from storing the reference position signal in response to the predetermined operation by the user in the normal mode.

9. The operation apparatus according to claim 1, further comprising a display that displays a warning to a user,
wherein, when the adjustment mode is set by the controller, the warning is displayed on the display.

10. A lens apparatus, which is mountable and dismountable to and from an operation apparatus, the lens apparatus comprising:

an optical element that is movable;

a first detector that detects a position signal corresponding to a position of the optical element in a state in which the lens apparatus is mounted to the operation apparatus;

a reference memory that stores a reference position signal, which is a position signal at a time when the optical element is located at a reference position, in the state in which the lens apparatus is mounted to the operation apparatus;

a determiner that determines whether or not the lens apparatus is dismounted from the operation apparatus after the reference position signal is stored; and a controller that switches between a case where the lens apparatus operates in an adjustment mode in which the reference position signal is stored in the reference memory and a case where the lens apparatus operates in a normal mode in which the reference position signal is not stored, wherein the controller controls the lens apparatus to operate in the adjustment mode when the determiner determines that the operation apparatus is dismounted from the lens apparatus after the reference position signal is stored.

11. A lens system, comprising:

a lens apparatus comprising an optical element that is movable;

an operation apparatus, which is mountable and dismountable to and from the lens apparatus;

a first detector that detects a position signal corresponding to a position of the optical element in a state in which the operation apparatus is mounted to the lens apparatus;

a reference memory that stores a reference position signal, which is a position signal at a time when the optical element is located at a reference position, in the state in which the operation apparatus is mounted to the lens apparatus;

a determiner that determines whether or not the operation apparatus is dismounted from the lens apparatus after the reference position signal is stored; and a controller that switches between a case where an instruction is transmitted so that the lens system operates in an adjustment mode in which the reference position signal is stored in the reference memory and a case where an instruction is transmitted so that the lens system operates in a normal mode in which the reference position signal is not stored, wherein the controller controls the lens system to operate in the adjustment mode when the determiner determines that the operation apparatus is dismounted from the lens apparatus after the reference position signal is stored.

12. An image pickup apparatus, comprising:

a lens system comprising:

a lens apparatus comprising an optical element that is movable;

an operation apparatus, which is mountable and dismountable to and from the lens apparatus;

a first detector that detects a position signal corresponding to a position of the optical element in a state in which the operation apparatus is mounted to the lens apparatus;

a reference memory that stores a reference position signal, which is a position signal at a time when the optical element is located at a reference position, in the state in which the operation apparatus is mounted to the lens apparatus;

a determiner that determines whether or not the operation apparatus is dismounted from the lens apparatus after the reference position signal is stored; and a controller that switches between a case where an instruction is transmitted so that the lens system operates in an adjustment mode in which the reference position signal is stored in the reference memory and a case where an instruction is transmitted so that the lens system operates in a normal mode in which the reference position signal is not stored, wherein the controller controls the lens system to operate in the adjustment mode when the determiner determines that the operation apparatus is dismounted from the lens apparatus after the reference position signal is stored; and an image pickup element configured to receive light from the lens system.

* * * * *